US011543501B2

(12) United States Patent
Van Dyck et al.

(10) Patent No.: US 11,543,501 B2
(45) Date of Patent: Jan. 3, 2023

(54) METHOD FOR SUBTRACTING BACKGROUND LIGHT FROM AN EXPOSURE VALUE OF A PIXEL IN AN IMAGING ARRAY, AND PIXEL FOR USE IN SAME

(71) Applicant: XENOMATIX NV, Leuven (BE)

(72) Inventors: Dirk Van Dyck, Aartselaar (BE); Rik Paesen, Diepenbeek (BE)

(73) Assignee: XENOMATIX NV, Leuven (BE)

( * ) Notice: Subject to any disclaimer, the term of this patent is extended or adjusted under 35 U.S.C. 154(b) by 888 days.

(21) Appl. No.: 16/337,336

(22) PCT Filed: Oct. 3, 2017

(86) PCT No.: PCT/EP2017/075093
§ 371 (c)(1),
(2) Date: Mar. 27, 2019

(87) PCT Pub. No.: WO2018/065426
PCT Pub. Date: Apr. 12, 2018

(65) Prior Publication Data
US 2020/0025894 A1 Jan. 23, 2020

(51) Int. Cl.
*G01S 7/00* (2006.01)
*G01S 7/487* (2006.01)
(Continued)

(52) U.S. Cl.
CPC .......... *G01S 7/4876* (2013.01); *G01S 7/4816* (2013.01); *G01S 7/4863* (2013.01); *G01S 7/4865* (2013.01); *G01S 17/894* (2020.01); *G01S 17/931* (2020.01)

(58) Field of Classification Search
USPC ...................................... 356/5.01
See application file for complete search history.

(56) References Cited

U.S. PATENT DOCUMENTS 6,888,122 B2 * 5/2005 Fossum ............. H01L 27/14643
348/E3.018
7,060,957 B2 * 6/2006 Lange .................. G01S 7/4863
250/208.1
(Continued)

FOREIGN PATENT DOCUMENTS

EP 2 290 393 A2 3/2011
EP 2 290 402 A1 3/2011
(Continued)

OTHER PUBLICATIONS

Japanese Office Action dated May 26, 2021 issued in corresponding Patent Application No. 2019-538730 w/English Translation (6 pages).
(Continued)

*Primary Examiner* — James R Hulka
(74) *Attorney, Agent, or Firm* — Polsinelli PC

(57) ABSTRACT

The invention pertains to a method for subtracting background light from an exposure value of a first pixel in an imaging array, said first pixel receiving a reflection of a spot from a scenery illuminated by a periodically pulsed pattern of spots, said periodically pulsed pattern comprising in alternation an illuminated phase and a non-illuminated phase, the method comprising: accumulating in said first pixel a charge in proportion to a first quantity of incident light, received in said first pixel while detecting said spot during a predetermined amount of time; and decreasing said charge in proportion to a second quantity of incident light received during said predetermined amount of time in absence of said spot. The invention also pertains to a pixel and an imaging array.

2 Claims, 7 Drawing Sheets

(51) Int. Cl.
*G01S 17/931* (2020.01)
*G01S 7/481* (2006.01)
*G01S 7/4863* (2020.01)
*G01S 7/4865* (2020.01)
*G01S 17/894* (2020.01)

(56) References Cited

U.S. PATENT DOCUMENTS

| | | | | |
|---|---|---|---|---|
| 7,119,350 | B2* | 10/2006 | Hashimoto | H01L 31/103 257/E27.152 |
| 7,485,862 | B2* | 2/2009 | Danziger | G01S 7/499 250/339.1 |
| 7,671,391 | B2* | 3/2010 | Kawahito | G01S 17/894 257/E31.124 |
| 8,736,818 | B2* | 5/2014 | Weimer | G01S 17/89 250/208.2 |
| 8,767,189 | B2* | 7/2014 | Mase | H04N 5/37452 356/3.01 |
| 8,908,063 | B2* | 12/2014 | Metz | G01S 7/4863 348/231.99 |
| 9,025,139 | B2* | 5/2015 | Kamiyama | H01L 31/109 257/448 |
| 9,182,490 | B2* | 11/2015 | Velichko | G01S 7/4816 |
| 9,329,035 | B2* | 5/2016 | Oggier | G01S 17/36 |
| 9,753,140 | B2* | 9/2017 | Cottrell | G01S 17/18 |
| 9,874,638 | B2* | 1/2018 | Dorrington | G01S 7/4815 |
| 2004/0008394 | A1 | 1/2004 | Lange et al. | |
| 2004/0041077 | A1 | 3/2004 | Fossum | |
| 2005/0145773 | A1 | 7/2005 | Hashimoto et al. | |
| 2007/0158770 | A1 | 7/2007 | Kawahito | |
| 2007/0177011 | A1 | 8/2007 | Lewin et al. | |
| 2007/0177841 | A1 | 8/2007 | Danziger | |
| 2010/0231891 | A1 | 9/2010 | Mase et al. | |
| 2012/0038903 | A1 | 2/2012 | Weimer et al. | |
| 2012/0200841 | A1 | 8/2012 | Kamiyama et al. | |
| 2013/0148102 | A1 | 6/2013 | Oggier | |
| 2014/0253758 | A1 | 9/2014 | Metz | |
| 2015/0144790 | A1 | 5/2015 | Velichko et al. | |
| 2015/0253429 | A1 | 9/2015 | Dorrington et al. | |
| 2015/0260830 | A1 | 9/2015 | Ghosh et al. | |
| 2015/0319347 | A1 | 11/2015 | Cottrell | |
| 2015/0341573 | A1 | 11/2015 | Matsuo et al. | |
| 2016/0018526 | A1 | 1/2016 | Van Den Bossche et al. | |
| 2016/0109575 | A1 | 4/2016 | Oggier et al. | |
| 2016/0266255 | A1 | 9/2016 | Nishikawa et al. | |
| 2016/0295133 | A1 | 10/2016 | Rudmann et al. | |
| 2018/0045513 | A1 | 2/2018 | Kitamura et al. | |
| 2018/0053799 | A1 | 2/2018 | Otani et al. | |
| 2018/0259647 | A1 | 9/2018 | Takano et al. | |

FOREIGN PATENT DOCUMENTS

| | | | |
|---|---|---|---|
| EP | 2 322 953 | A1 | 5/2011 |
| EP | 2 634 595 | A1 | 9/2013 |
| EP | 3 159 711 | A1 | 4/2017 |
| JP | 2002-526989 | A | 8/2002 |
| JP | 2003-532122 | A | 10/2003 |
| JP | 2004-294420 | A | 10/2004 |
| JP | 2008-032427 | A | 2/2008 |
| KR | 10-2016-0029845 | A | 3/2016 |
| WO | 2004/012269 | A1 | 2/2004 |
| WO | 2014/122714 | A1 | 8/2014 |
| WO | 2015/004213 | A1 | 1/2015 |
| WO | 2015/162278 | A1 | 10/2015 |
| WO | 2016/020073 | A1 | 2/2016 |
| WO | 2016/076796 | A1 | 5/2016 |

OTHER PUBLICATIONS

European Search Report dated Apr. 26, 2017 in the priority application EP 16 19 2105.1. 9 pages.

International Search Report dated Feb. 6, 2018 the parent application PCT/EP2017/075093. 3 pages.

Anon, "Laser Range-Gated Imaging for Imaging at Long Ranges and Through Obsurants (Fog, Smoke, Mist, Haze, (Rain)", Laser Range Gating—Long Range & Obsurants, Jun. 9, 2018, (pp. 1-5).

Büttgen et al., "Pseudonoise Optical Modulation for Real-Time 3-D Imaging With Minimum Interference", IEEE Transactions on Circuits and Systems—I: Regular Papers, vol. 54, No. 10, Oct. 2007, (pp. 2109-2119).

Huang et al., "Monolithic Integrated Piezoelectric MEMS-Tunable VCSEL", IEEE Journal of Selected Topics in Quantum Electronics, vol. 13, No. 2, Mar./Apr. 2007, (pp. 374-380).

Kawahito et al., "A Cmos Time-of-Flight Range Image Sensor With Gates-on-Field-Oxide Structure", IEEE Sensors Journal, vol. 7, No. 12, Dec. 2007, (pp. 1578-1586).

Stoppa et al., "An 80×60 Range Image Sensor Based on 10 µm 50MHz Lock-In Pixels in 0.18 µm CMOS", IEEE International Solid-State Circuits Conference, 2010, (3 pages).

European Office Action dated Jun. 2, 2022 issued in corresponding Patent Application No. 20 195 172.0 (7 pages).

Korean Office Action dated Mar. 3, 2022 issued in corresponding Patent Application No. 10-2019-7012602 w/English Translation (8 pages).

* cited by examiner

METHOD FOR SUBTRACTING BACKGROUND LIGHT FROM AN EXPOSURE VALUE OF A PIXEL IN AN IMAGING ARRAY, AND PIXEL FOR USE IN SAME

CROSS REFERENCE TO RELATED APPLICATIONS

This application is a National Phase filing under 35 U.S.C. § 371 of PCT/EP2017/075093, entitled "METHOD FOR SUBTRACTING BACKGROUND LIGHT FROM AN EXPOSURE VALUE OF A PIXEL IN AN IMAGING ARRAY, AND PIXEL FOR USE IN SAME" filed on Oct. 3, 2017, and claims priority to European Patent Application No. EP 16192105.1, entitled "METHOD FOR SUBTRACTING BACKGROUND LIGHT FROM AN EXPOSURE VALUE OF A PIXEL IN AN IMAGING ARRAY, AND PIXEL FOR USE IN SAME" filed on Oct. 3, 2016. The entire contents of each application are hereby incorporated by reference.

FIELD OF THE INVENTION

The present invention pertains to the field of imaging systems, and in particular to a method for subtracting background light from an exposure value of a pixel in an imaging array, and to a pixel for use in such a method. The present invention may be used inter alia in systems for determining a distance to an object, in particular to time-of-flight based sensing systems to be used for the characterization of a scene or a part thereof.

BACKGROUND

In the field of remote sensing technology, mainly in the usage of making high-resolution maps of the surroundings, to be used in many control and navigation applications such as but not limited to the automotive and industrial environment, gaming applications, and mapping applications, it is known to use time-of-flight based sensing to determine the distance of objects from a sensor. Time-of-flight based techniques include the use of RF modulated sources, range gated imagers, and direct time-of-flight (DToF) imagers. For the use of RF modulated sources and range gated imagers, it is necessary to illuminate the entire scene of interest with a modulated or pulsed source. Direct time-of-flight systems, such as most LIDARs, mechanically scan the area of interest with a pulsed beam, the reflection of which is sensed with a pulse detector.

In order to be able to correlate an emitted RF modulated signal with the detected reflected signal, the emitted signal must meet a number of constraints. In practice, these constraints turn out to make the RF modulated systems highly impractical for use in vehicular systems: the attainable range of detection is very limited for signal intensities that are within conventional safety limits and within the power budget of regular vehicles.

A direct TOF (DToF) imager, as used in most LIDAR systems, comprises a powerful pulsed laser (operating in a nanosecond pulse regime), a mechanical scanning system to acquire from the 1D point measurement a 3D map, and a pulse detector. Systems of this type are presently available from vendors including Velodyne Lidar of Morgan Hill, Calif. The Velodyne HDL-64E, as an example of state-of-the-art systems, uses 64 high-power lasers and 64 detectors (avalanche diodes) in a mechanically rotating structure at 5 to 15 rotations per second. The optical power required by these DToF LIDAR systems is too high to be obtained with semiconductor lasers, whose power is in the range of five to six orders of magnitude lower. In addition, the use of mechanically rotating elements for scanning purposes limits the prospects for miniaturization, reliability, and cost reduction of this type of system.

United States Patent application publication no. 2015/0063387 in the name of Trilumina discloses a VCSEL delivering a total energy of 50 mW in a pulse having a pulse width of 20 ns. The commercially available Optek OPV310 VCSEL delivers a total energy of 60 mW in a pulse having a duration of 10 ns and it can be estimated by extrapolation to have a maximum optical output power of 100 mW. This value is only realized under very stringent operating conditions, meaning optimal duty cycle and short pulse width so as to avoid instability due to thermal problems. Both the Trilumina disclosure and the Optek system illustrate that continuous-wave VCSEL systems are reaching their physical limits with respect to optical peak power output, due to thermal constraints inherently linked to the VCSEL design. At these pulse energy levels, and using ns pulses as presently used in DToF applications, the mere number of photons that can be expected to be usefully reflected by an object at a distance of 120 m is so low that it defeats detection by means of conventional semiconductor sensors such as CMOS or CCD or SPAD array. Thus, increasing the VCSEL power outputs by 5 or 6 orders of magnitude, as would be required to extend the range of the known DToF systems, is physically impossible.

Even the use of avalanche diodes (AD or SPAD), which are theoretically sufficiently sensitive to capture the few returning photons, cannot be usefully deployed in the known LIDAR system architectures. A solid state implementation of an array of SPADs must be read out serially. A high number of SPADs is required to achieve the desired accuracy. The serial read-out constraints of the solid state implementation limit the bandwidth of the system turning it inappropriate for the desired accuracy. For accuracies such as that of the Velodyne system (0.02 m to 0.04 m, independent of distance), the required read-out data rate exceeds the practically achievable bandwidth in case of today's IC implementation. For operation at 120 m, a SPAD array of 500×500 pixels is required, which, in an IC-based implementation, must be read-out serially. For the same precision as the aforementioned Velodyne system, it would require 1000 pulses per millisecond and hence 1000 frames per millisecond, translating into a readout rate of 250 Gigapixels per second. This is believed to be technically unfeasible in the context of current SPAD IC technology.

The paper by Neil E. Newman et al., "High Peak Power VCSELs in Short Range LIDAR Applications", *Journal of Undergraduate Research in Physics,* 2013, http://www.jurp.org/2013/12017EXR.pdf, describes a VCSEL-based LIDAR application. The paper states that the maximum output power of the described prototype system was not great enough to do wide-field LIDAR at a range greater than 0.75 m. With a relatively focused beam (0.02 m spot size at 1 m distance), the authors were able to range a target object at a distance of up to 1 m.

The above examples clearly indicate that the optical power emitted by present semiconductor lasers cannot meet the power requirements necessary for operations in the known LIDAR systems to be of practical use in automotive applications (e.g. for ranges up to 120 m).

U.S. Pat. No. 7,544,945 in the name of Avago Technologies General IP (Singapore) Pte. Ltd., discloses vehicle-based LIDAR systems and methods using multiple lasers to provide more compact and cost-effective LIDAR functionality. Each laser in an array of lasers can be sequentially activated so that a corresponding optical element mounted with respect to the array of lasers produces respective interrogation beams in substantially different directions. Light from these beams is reflected by objects in a vehicle's environment, and detected so as to provide information about the objects to vehicle operators and/or passengers. The patent provides a solid state projector in which the individual lasers are consecutively activated in order to replace the known mechanical scanning in the known DToF LIDAR systems.

A high-accuracy medium-range surround sensing system for vehicles that does not use time-of-flight detection, is known from international patent application publication WO 2015/004213 A1 in the name of the present applicant. In that publication, the localization of objects is based on the projection of pulsed radiation spots and the analysis of the displacement of detected spots with reference to predetermined reference spot positions. More in particular, the system of the cited publication uses triangulation. However, the accuracy that can be achieved correlates with the triangulation base, which limits the further miniaturization that can be achieved.

US patent application publication no. US 2012/0038903 A1 discloses methods and systems for adaptively controlling the illumination of a scene. In particular, a scene is illuminated, and light reflected from the scene is detected. Information regarding levels of light intensity received by different pixels of a multiple pixel detector, corresponding to different areas within a scene, and/or information regarding a range to an area within a scene, is received. That information is then used as a feedback signal to control levels of illumination within the scene. More particularly, different areas of the scene can be provided with different levels of illumination in response to the feedback signal.

European patent application publication no. EP 2 322 953 A1 discloses a distance image sensor capable of enlarging the distance measurement range without reducing the distance resolution. A radiation source provides first to fifth pulse trains which are irradiated to the object as radiation pulses in the first to fifth frames arranged in order on a time axis. In each of the frames, imaging times are prescribed at points of predetermined time from the start point of each frame, also the pulses are shifted respectively by shift amounts different from each other from the start point of the first to fifth frames. A pixel array generates element image signals each of which has distance information of an object in distance ranges different from each other using imaging windows A and B in each of five frames. A processing unit generates an image signal by combining the element image signals. Since five times-of-flight measurement are used, the width of the radiation pulse does not have to be increased to obtain distance information of the object in a wide distance range, and the distance resolution is not reduced.

European patent application publication no. EP 2 290 402 A1 discloses a range image sensor which is provided on a semiconductor substrate with an imaging region composed of a plurality of two-dimensionally arranged units, thereby obtaining a range image on the basis of charge quantities output from the units. One of the units is provided with a charge generating region (region outside a transfer electrode) where charges are generated in response to incident light, at least two semiconductor regions which are arranged spatially apart to collect charges from the charge generating region, and a transfer electrode which is installed at each periphery of the semiconductor region, given a charge transfer signal different in phase, and surrounding the semiconductor region.

The article by Shoji Kawahito et al., "A CMOS Time-of-Flight Range Image Sensor With Gates-on-Field-Oxide Structure", *IEEE Sensors Journal*, Vol. 7, no. 12, p. 1578-1586, discloses a type of CMOS time-of-flight (TOS) range image sensor using single-layer gates on field oxide structure for photo conversion and charge transfer. This structure allows the realization of a dense TOF range imaging array with 15×15 µm² pixels in a standard CMOS process. Only an additional process step to create an n-type buried layer which is necessary for high-speed charge transfer is added to the fabrication process. The sensor operates based on time-delay dependent modulation of photocharge induced by back reflected infrared light pulses from an active illumination light source. To reduce the influence of background light, a small duty cycle light pulse is used and charge draining structures are included in the pixel. The TOF sensor chip fabricated measures a range resolution of 2.35 cm at 30 frames per second an improvement to 0.74 cm at three frames per second with a pulse width of 100 ns.

All systems that rely on the detection of structured light emitted onto the scenery to be sensed, require a way to distinguish illuminated portions of the scenery from non-illuminated portions, despite the presence of ambient light. Hence, there is a continuing need to obtain methods and pixels that allow reliable removal of the background illumination component from an exposure value.

SUMMARY OF THE INVENTION

According to an aspect of the present invention, there is provided a method for subtracting background light from an exposure value of a first pixel in an imaging array, said first pixel receiving a reflection of a spot from a scenery illuminated by a periodically pulsed pattern of spots, said periodically pulsed pattern comprising in alternation an illuminated phase and a non-illuminated phase, the method comprising: accumulating in said first pixel a charge in proportion to a first quantity of incident light, received in said first pixel while detecting said spot during a predetermined amount of time; and decreasing said charge in proportion to a second quantity of incident light received during said predetermined amount of time in absence of said spot.

It is an advantage of the present invention that the background illumination is detected with components that are virtually identical to the components that detect the useful signal, and that both the background illumination and the useful signal are integrated over the same amount of time. In this way, an optimal pair of signals is obtained for subtraction.

In an embodiment of the method according to the present invention, the second quantity of incident light comprises light received in said first pixel during said predetermined amount of time in the non-illuminated phase.

It is an advantage of this embodiment that the background illumination is detected with components that are exactly the same as the components that detect the useful signal, which detect light originating from a single location in the scenery (apart from possibly a slight shift due to movement of the sensor), such that the comparison between the illuminated phase and the non-illuminated phase provides a subtraction of the background illumination at that very location.

In another embodiment of the method according to the present invention, the second quantity of incident light comprises light received, during said accumulating, in a second pixel of the pixel array, the second pixel being at a sufficient distance from the first pixel so as not to be illuminated by said spot.

It is an advantage of this embodiment that the background illumination is detected at the same time as the useful signal, such that the subtraction of the background illumination is not sensitive to changes in the level of background illumination over time.

According to an aspect of the present invention, there is provided a pixel adapted for use as said first pixel in the method described above.

In an embodiment, the pixel comprises a capacitor for storing said charge, said capacitor having a first side and a second side, wherein said accumulating comprises transferring charges to said first side, and wherein said decreasing comprises transferring charges to said second side.

It is an advantage of this embodiment of the pixel according to the invention that it implements the inventive method of background subtraction in a very compact and reliable way, and without relying on additional digital computations.

According to an aspect of the present invention, there is provided an imaging array comprising a plurality of pixels as described above.

According to an aspect of the present invention, there is provided a system for determining a distance to an object comprising: a solid-state light source arranged for projecting a pattern of spots of laser light towards the object in a sequence of pulses; a detector comprising the imaging array as described above, the detector being configured for detecting light representing the pattern of spots as reflected by the object in synchronization with the sequence of pulses; and processing means configured to calculate the distance to the object as a function of exposure values generated by the pixels in response to the detected light; wherein the pixels are configured to generate the exposure values by accumulating, for each pulse of the sequence, a first amount of electrical charge representative of a first amount of light reflected by the object during a first predetermined time window and a second electrical charge representative of a second amount of light reflected by the object during a second predetermined time window, the second predetermined time window occurring after the first predetermined time window.

The inventors have found that the improved background subtraction method of the present invention can contribute to achieving the demanding power/performance requirements of automotive applications with a compact, semiconductor based time-of-flight based ranging system.

BRIEF DESCRIPTION OF THE FIGURES

These and other aspects and advantages of the present invention will now be described in more detail with reference to the accompanying drawings, in which.

DETAILED DESCRIPTION OF EMBODIMENTS

Figure 1:
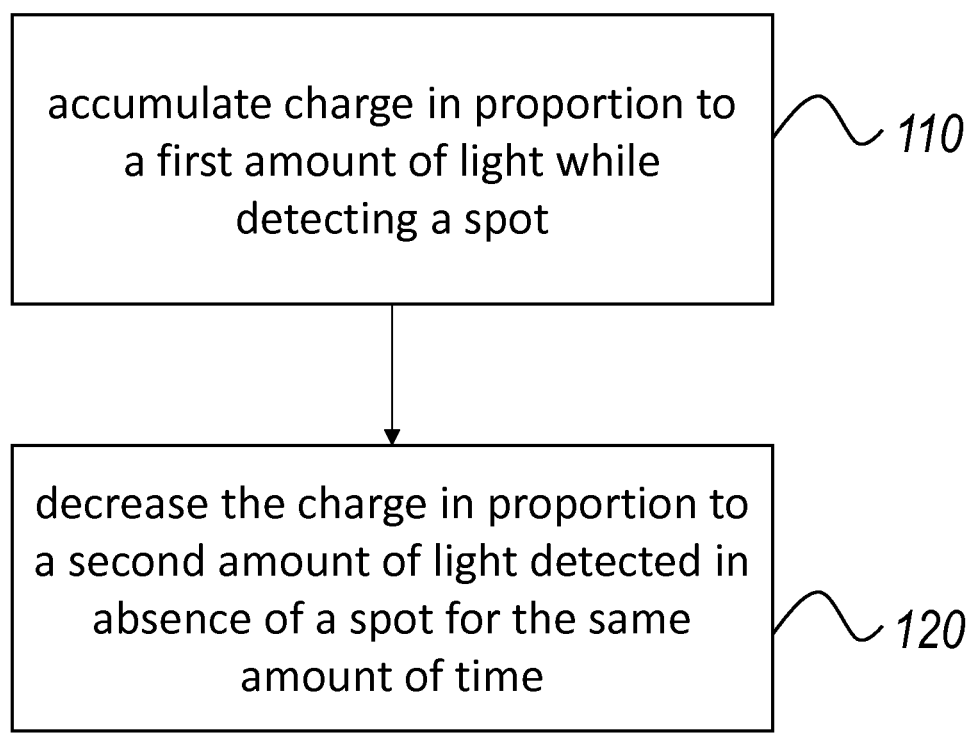
FIG. 1 represents a flow chart of an embodiment of the method according to the present invention.

FIG. 1 represents a flow chart of an embodiment of the method for subtracting background light from an exposure value of a first pixel in an imaging array according to the present invention. The first pixel receives a reflection of a spot from a scenery illuminated by a periodically pulsed pattern of spots, the periodically pulsed pattern comprising in alternation an illuminated phase and a non-illuminated phase.

The method comprises accumulating 110 in the first pixel a charge in proportion to a first quantity of incident light, received in the first pixel while detecting the spot during a predetermined amount of time. The term "accumulating" is used herein to designate both an operation of an electronic circuit capable of collecting cumulative amounts of charge, and a mathematical operation carried out by digital computation means.

To remove the infuence of the ambient light from the exposure value, the method further comrpises decreasing 120 the accumulated charge in proportion to a second quantity of incident light received during the same predetermined amount of time, but in absence of a spot.

The second quantity of incident light may be obtained by receiving light the same pixel during an equal amount of time in the non-illuminated phase of the pulsed pattern. Alternatively, the second quantity of incident light may be obtained by receiving light simultaneously with the receiving of the spot, but in a different pixel of the pixel array. This variant relies on the fact that the projected pattern consists of distinct spots, and requires that the second pixel be at a sufficient distance from the first pixel so as not to be illuminated by the same spot.

Figure 2:
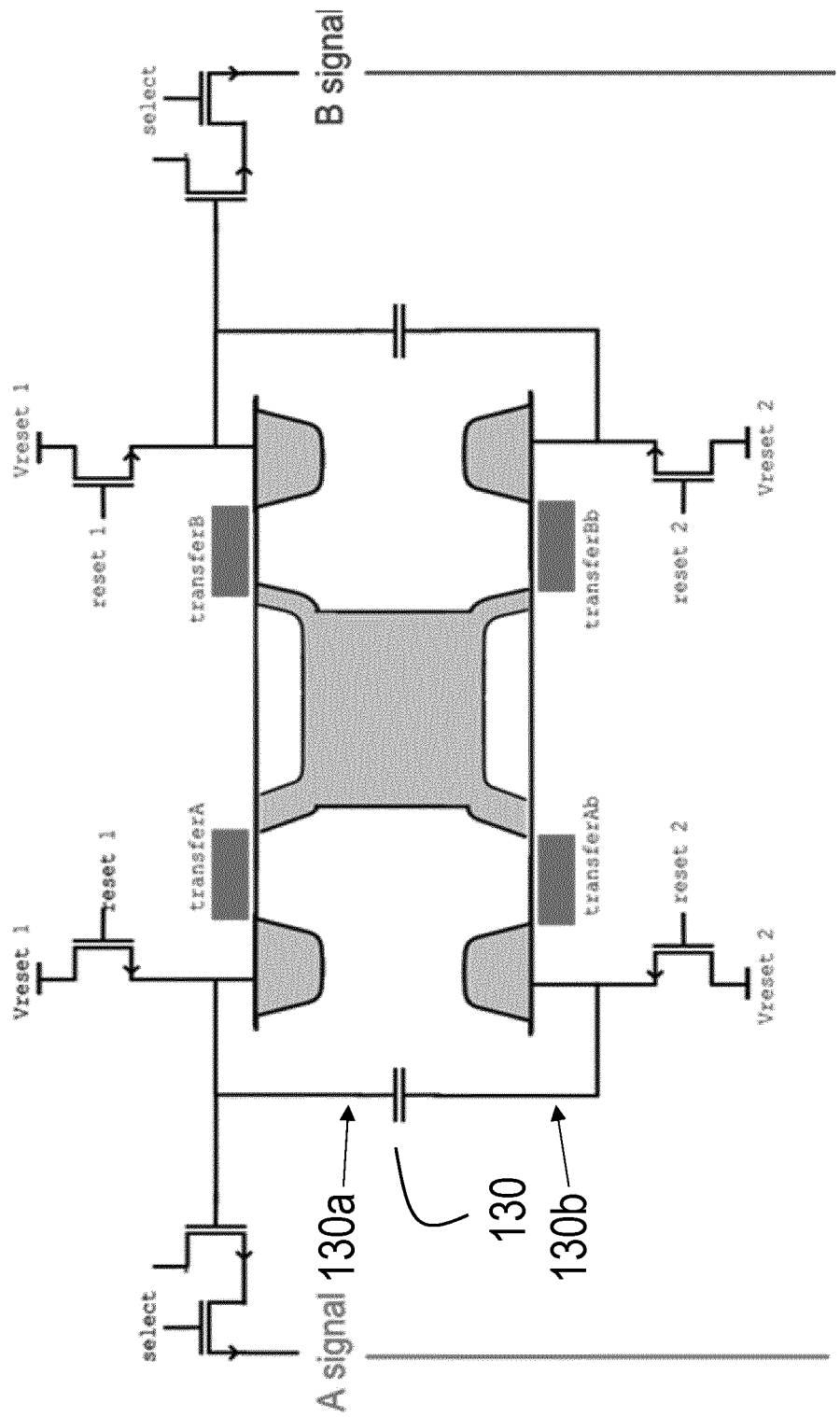
FIG. 2 schematically represents an embodiment of the pixel according to the present invention.

FIG. 2 schematically represents an embodiment of the pixel according to the present invention. The pixel is suitable for use in the method described above, and may be part of an imaging array.

The pixel comprises a capacitor 130 for storing the charge, said capacitor having a first side 130a and a second side 130b. The accumulating 110 comprises transferring charges to the first side 130a, and the decreasing 120 comprises transferring charges to said second side 130b. Subsequently, the voltage over the capacity 130 is measured, which represents the difference between the laser spot induced charges and the background charges.

The reasons for the presence of a second capacitor and a second pair of wells at the opposite side of the light sensitive element (righthand side of FIG. 2, leading to "B signal") will become apparent from the following description of the range-gating method.

The inventors have found that the pixel array according to the present invention can advantageously be applied in a novel type of ranging system which aims to achieve the same power/performance characteristics with a compact, semiconductor based time-of-flight based system. Accordingly, an aspect of the present invention concerns a ranging system comprising the pixel array described above.

In this aspect of the invention, the limitations of the existing LIDAR-based systems are overcome by changing the way the time-of-flight based system operates. The total amount of light energy emitted for each time-of-flight measurement (and thus, the number of photons available for detection at the detector for each time-of-flight measurement) may be increased by increasing the duration of individual pulses and by producing a virtual "composite pulse", consisting of a sequence of a large number of individual pulses. This bundling of extended pulses allowed the inventors to obtain the required amount of light energy (photons) for the desired operational range with low-power VCSELs.

Where an individual pulse of pre-existing LIDAR systems may have a duration of 1 ns, the presently described systems benefit from a substantially longer pulse duration to partially compensate for the relatively low power level of semiconductor lasers such as VCSELs; in embodiments of the present invention, individual pulses within a sequence may have an exemplary duration of 1 μs (this is one possible value, chosen here to keep the description clear and simple; more generally, in embodiments of the present invention, the pulse duration may for example be 500 ns or more, preferably 750 ns or more, most preferably 900 ns or more). In an exemplary system according to the present invention, a sequence may consist of 1000 pulse cycles, thus adding up to a duration of 1 ms. Given the fact that light would need approximately 0.66 μs to travel to a target at a distance of 100 m and back to the detector, it is possible to use composite pulses of this duration for ranging at distance of this order of magnitude; the skilled person will be able to adjust the required number of pulse cycles in function of the selected pulse width and the desired range. The detection of the sequence preferably comprises detecting the individual pulses in synchronization with the VCSEL-based light source, and accumulating the charges generated in response to the incoming photons at the pixel well level for the entire sequence prior to read-out. The term "exposure value" is used hereinafter to designate the value representative of the charge (and thus of the amount of light received at the pixel) integrated over the sequence. The sequence emission and detection may be repeated periodically.

The ranging system of the present invention operates by using range gating. Range gated imagers integrate the detected power of the reflection of the emitted pulse for the duration of the pulse. The amount of temporal overlap between the pulse emission window and the arrival of the reflected pulse depends on the return time of the light pulse, and thus on the distance travelled by the pulse. Thus, the integrated power is correlated to the distance travelled by the pulse. The present invention uses the principle of range gating, as applied to the sequences of pulses described hereinabove. In the following description, the integration of individual pulses of a sequence at the level of a picture element to obtain a measurement of the entire sequence is implicitly understood.

Figure 3:
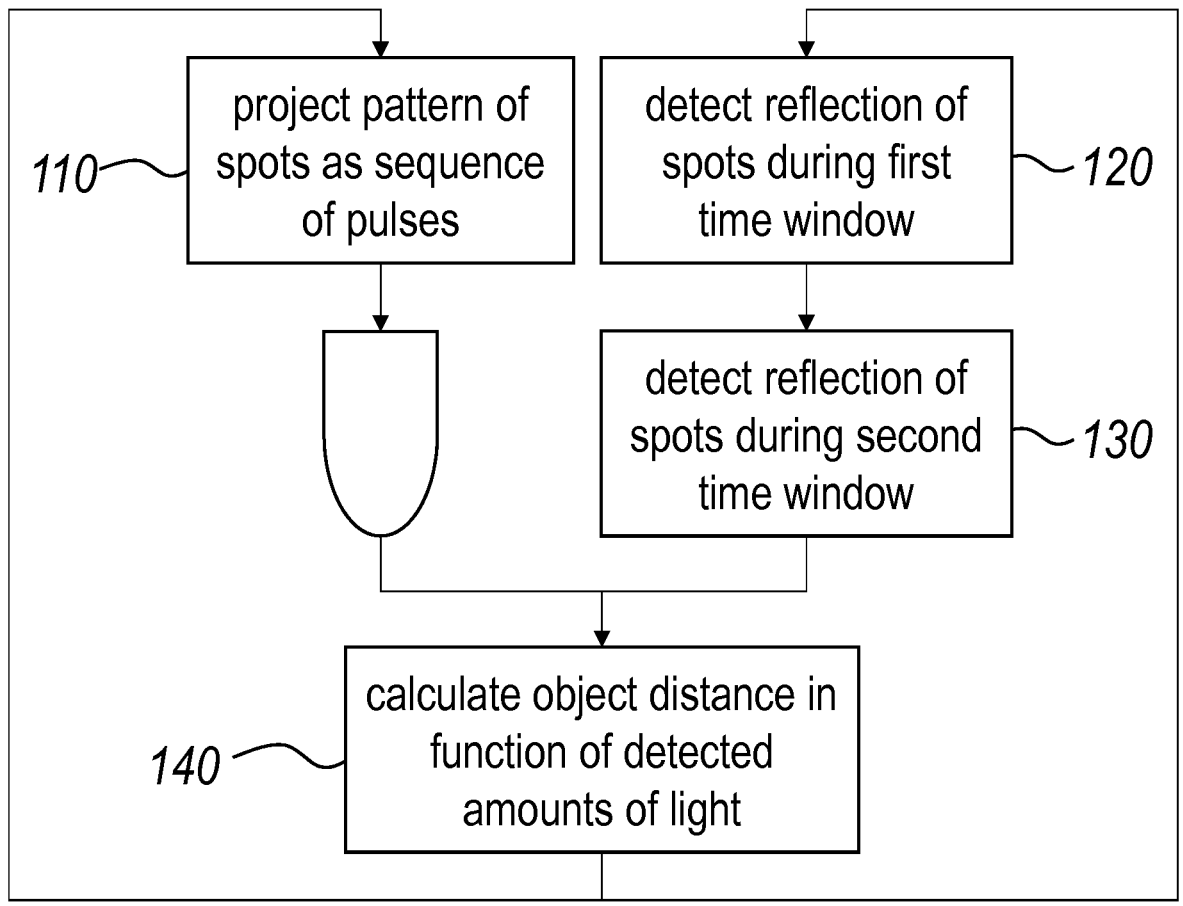
FIG. 3 represents a flow chart of an embodiment of the method according to the present invention.

FIG. 3 represents a flow chart of an applicable ranging method. Without loss of generality, the ranging method is described with reference to a range gating algorithm. In a first time window 10, the method comprises projecting 110 a pattern of spots of laser light (e.g. a regular or an irregular spatial pattern of spots) from a light source comprising a solid-state light source 210 onto any objects in the targeted area of the scenery. The spatial pattern is repeatedly projected in a sequence of pulses.

As indicated above, the solid-state light source may comprise a VCSEL array or a laser with a grating adapted to produce the desired pattern. In order for the system to operate optimally, even at long ranges and with high levels of ambient light (e.g., in daylight), a VCSEL for use in embodiments of the present invention is preferably arranged to emit a maximum optical power per spot per unit of area. Thus, lasers with a good beam quality (low M2-factor) are preferred. More preferably, the lasers should have a minimal wavelength spread; a particularly low wavelength spread can be achieved with monomode lasers. Thus, substantially identical pulses can reproducibly be generated, with the necessary spatial and temporal accuracy.

During the same time window in which a pulse is emitted, or in a substantially overlapping time window, a first amount of light representing the pattern of spots as reflected by the object of interest is detected 120 at a detector, which is preferably arranged as near as possible to the light source. The synchronicity or near synchronicity between the projection 110 of the spot pattern and the first detection 120 of its reflection, is illustrated in the flow chart by the side-by-side arrangement of these steps. In a subsequent second predetermined time window 20, a second amount of light representing the reflected light spot is detected 130 at the detector. During this second window 20, the solid-state light source is inactive. The distance to the object can then be calculated 140 as a function of the first amount of reflected light and the second amount of reflected light.

The first predetermined time window 10 and the second predetermined time window 20 are preferably back-to-back windows of substantially equal duration, to facilitate noise and ambient light cancellation by subtracting one of the detected amounts from the other one. An exemplary timing scheme will be described in more detail below in conjunction with FIG. 5.

The detector comprises a pixel array as described above, which is configured to perform background light subtraction as described in connection with FIGS. 1 and 2, with adequate optics arranged to project an image of the scenery (including the illuminated spots) onto the picture element.

The term "picture element" as used herein may refer to an individual light-sensitive area or well of a pixel, or to an entire pixel (which may comprise multiple wells, see below). For every given projected spot, the detecting 120 of the first amount of light and the detecting 130 of the second amount of light occurs at the same one or the same group of the plurality of picture elements.

Without loss of generality, each of the picture elements may be a pixel comprising at least two charge storage wells 221, 222, such that the detecting 120 of the first amount of light and the detecting 130 of the second amount of light can occur at the respective charge storage wells 221, 222 of the same pixel or pixel group.

Figure 4:
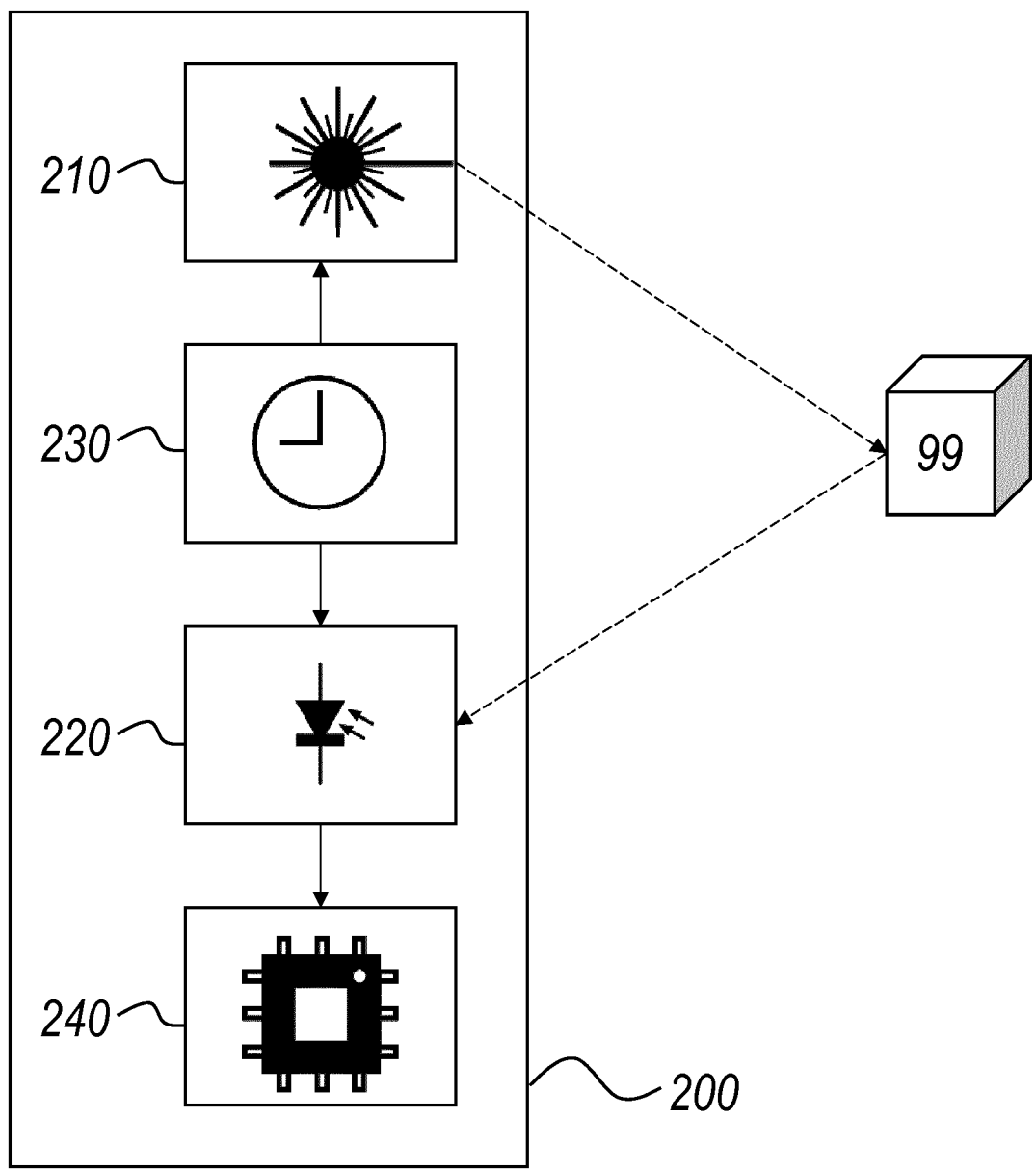
FIG. 4 schematically represents an embodiment of the system according to the present invention.

FIG. 4 schematically represents an embodiment of the system according to the present invention, in relation to an object 99 in the scenery of interest. The system 200 comprises a solid-state light source 210 for projecting a pattern of a sequence of spots, which may be repeated periodically, onto the object 99. A detector 220 is arranged near the light source and configured to detect light reflected by the object.

The light beam bouncing off the object 99 is illustrated as an arrow in dashed lines, travelling from the light source 210 to the object 99 and back to the detector 220. It should be noted that this representation is strictly schematic, and not intended to be indicative of any actual relative distances or angles.

A synchronization means 230, which may include a conventional clock circuit or oscillator, is configured to operate the solid-state light source 210 so as to project the pattern of spots onto the object during first predetermined time windows 10 and to operate the detector 220 so as to detect a first amount of light representing the light spot(s) reflected by the object 99 at substantially the same time. It further operates the detector 220 to detect a second amount of light representing the light spots reflected by the object 99, during respective subsequent second predetermined time windows 20. Appropriate processing means 240 are configured to calculate the distance to the object as a function of the first amount of reflected light and the second amount of reflected light.

FIG. 5 represents a timing diagram for light projection and detection in embodiments of the present invention. For clarity reasons, only a single pulse of the pulse sequence which is repeated periodically of FIG. 3 is illustrated, which consists of a first time window 10 and a second time window 20.

Figure 5A:
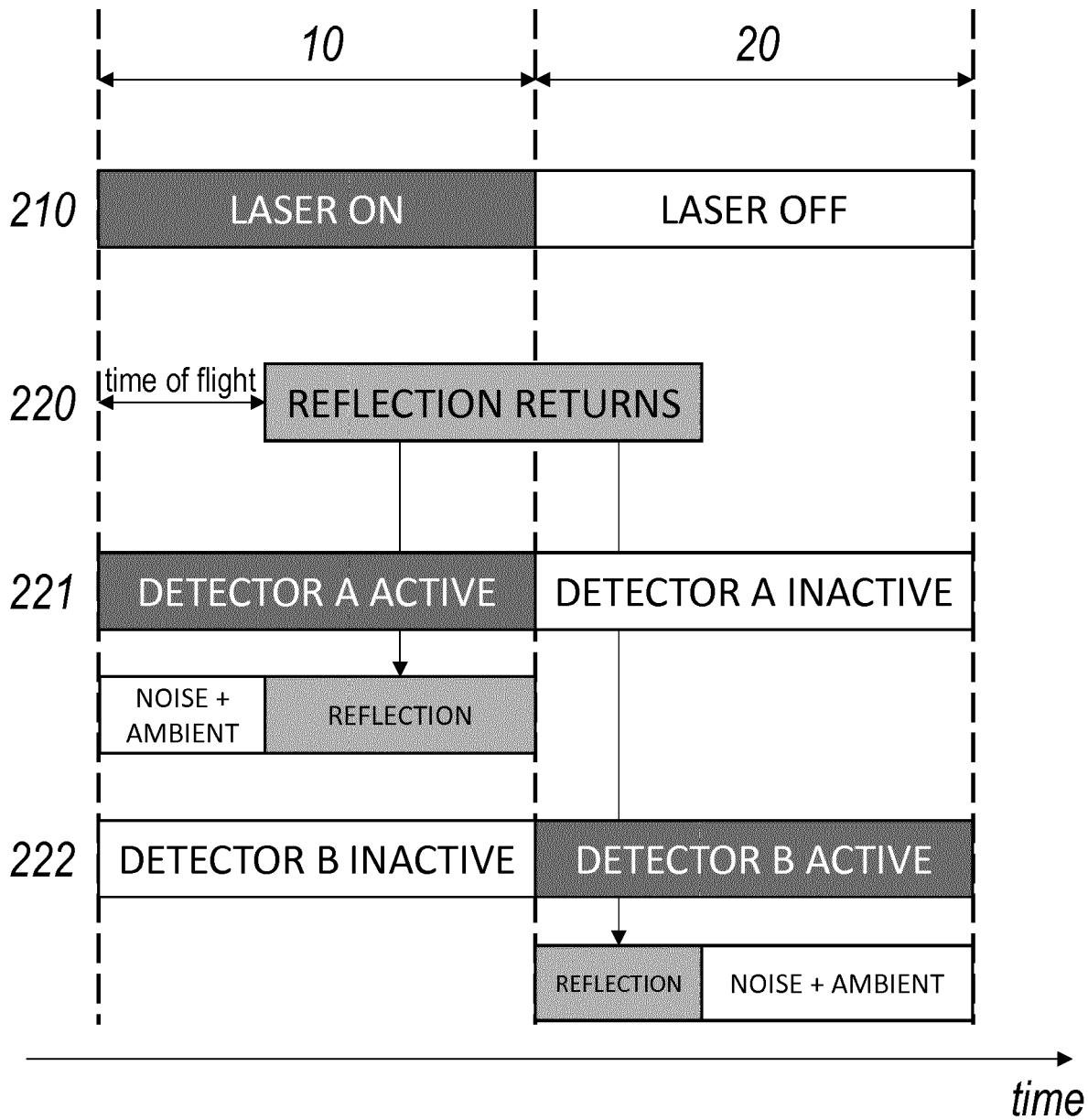
FIG. 5 represents a timing diagram for light projection and detection in embodiments of the present invention.

As can be seen in FIG. 5a, during the first time window 10, the solid-state light source 210 is in its "ON" state, emitting the pattern of light spots onto the scenery. During the second time window 20, the solid-state light source 210 is in its "OFF" state.

The arrival of the reflected light at the detector 220 is delayed relative to the start of the projection by an amount of time that is proportional to the distance travelled (approximately 3.3 ns/m in free space). Due to this delay, only a part of the reflected light will be detected at the first well 221 of the detector 220, which is only activated during the first time window 10. Thus, the charge accumulated in this first well during its period of activation (the first time window 10) consists of a part representing only the noise and the ambient light impinging on the pixel prior to the arrival of the reflected pulse, and a part representing the noise, the ambient light, and the leading edge of the reflected pulse.

The latter part of the reflected pulse will be detected at the second well 222 of the detector 220, which is only activated during the second time window 20, which preferably immediately follows the first time window 10. Thus, the charge accumulated in this second well during its period of activation (the second time window 20) consists of a part representing the noise, the ambient light, and the trailing edge of the reflected pulse, and a part representing only the noise and the ambient light impinging on the pixel after the arrival of the reflected pulse.

The greater the distance between the reflecting object 99 and the system 200, the smaller the proportion of the pulse that will be detected in the first well 221 and the larger the proportion of the pulse that will be detected in the second well 222.

If the leading edge of the reflected pulse arrives after the closing of the first well 221 (i.e., after the end of the first time window 10), the proportion of the reflected pulse that can be detected in the second well 222 will decrease again with increasing time of flight delay.

Figure 5B:
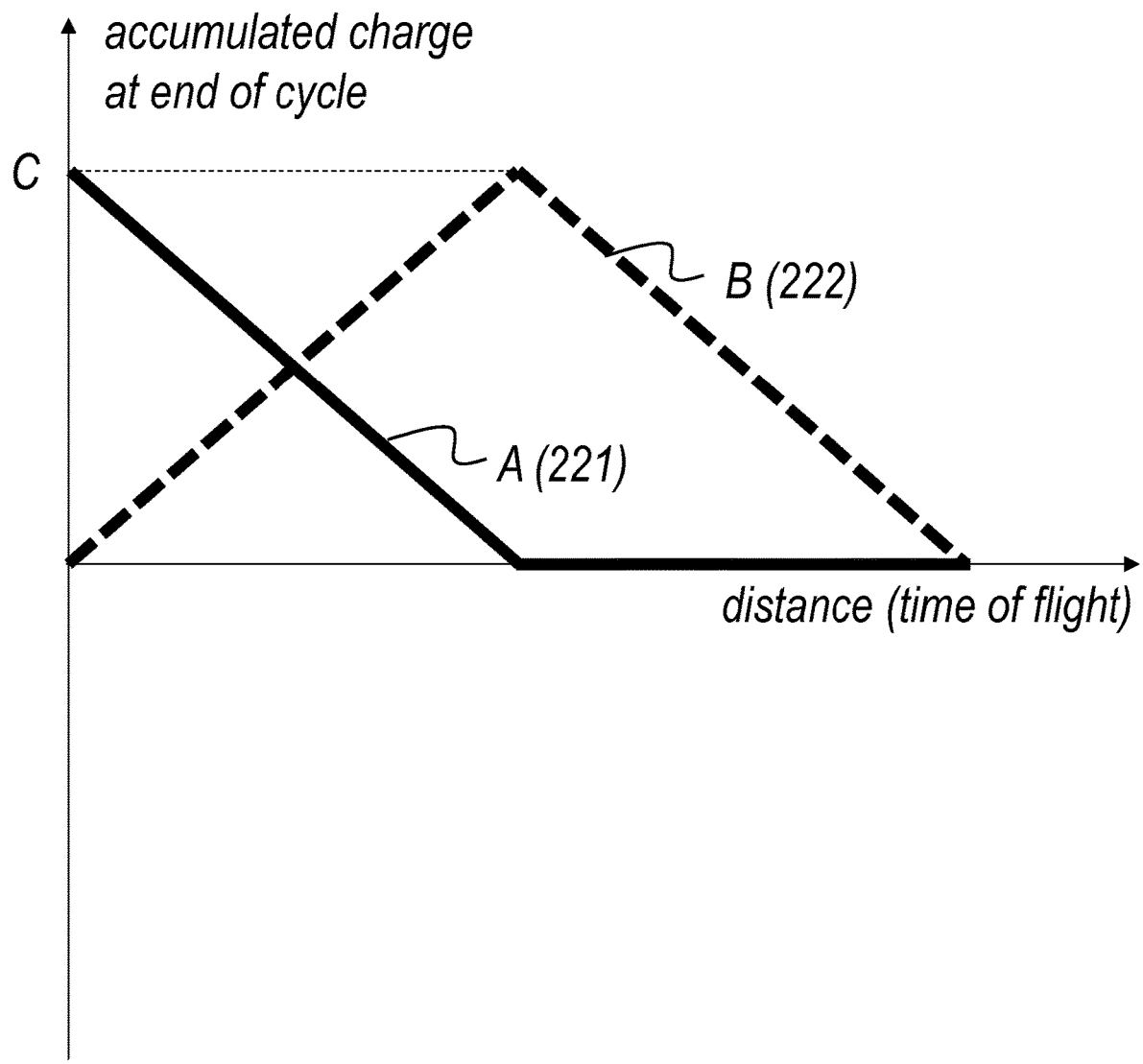

The resulting amounts of charge A, B in each of the respective wells 221, 222 for varying distances of the object 99 are shown in FIG. 5b. To simplify the representation, the effect of the attenuation of light with distance, according to the inverse square law, has not been taken into account in the diagram. It is clear that for time of flight delays up to the combined duration of the first time window 10 and the second time window 20, the time of flight delay can in principle unambiguously be derived from the values of A and B:

For time of flight delays up to the duration of the first time window 10, B is proportional to the distance of the object 99. To easily arrive at a determination of the absolute distance, the normalized value B/(B+A) may be used, removing any impact of non-perfect reflectivity of the detected object and of the inverse square law.

For time of flight delays exceeding the duration of the first time window 10, A consists of daylight and noise contributions only (not illustrated), and C-B is substantially proportional (after correcting for the inverse square law) to the distance of the object 99, where C is an offset value.

Figure 5C:
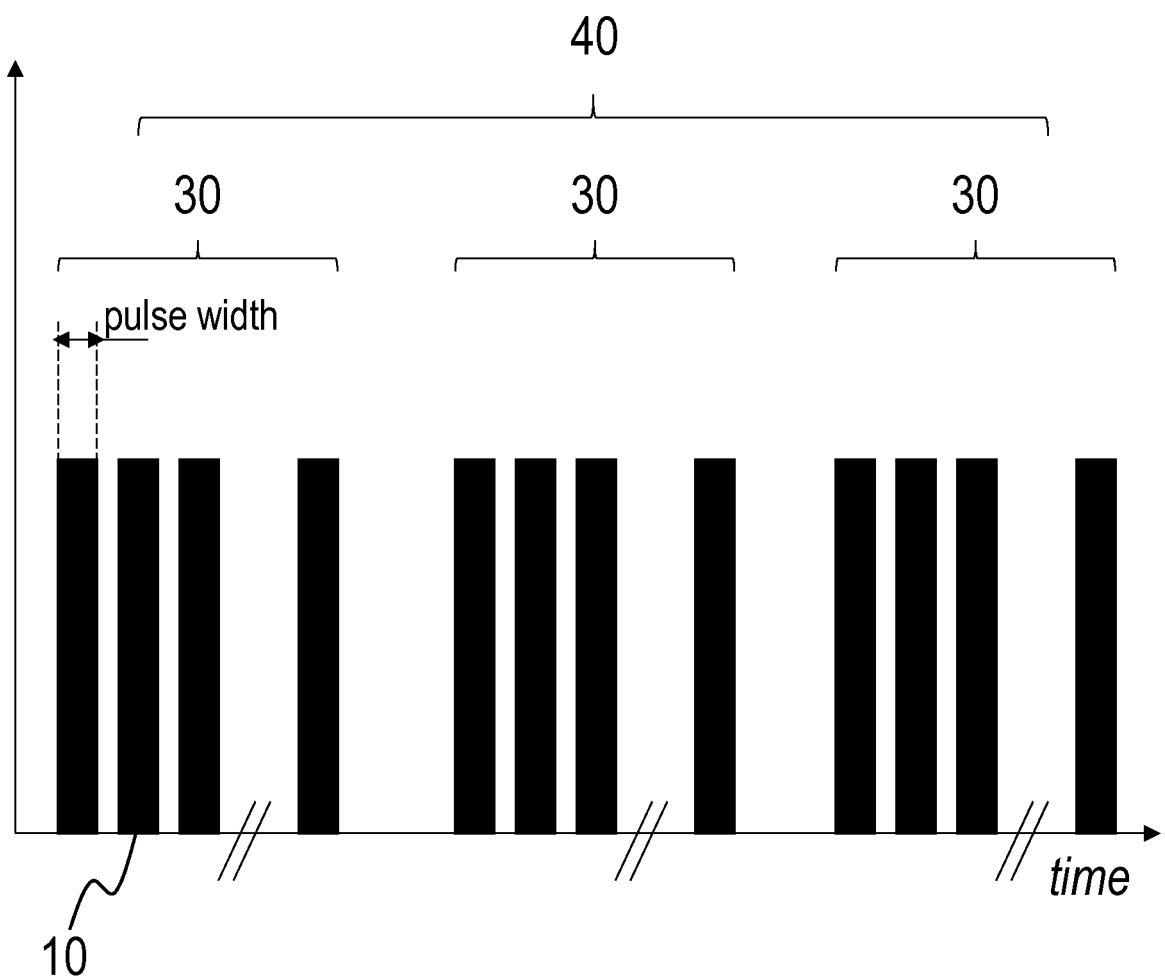

While FIGS. 5a and 5b illustrate the principle of the invention in relation to a single pulse emitted in the time window 10, it shall be understood that the illustrated pulse is part of a sequence of pulses as defined above. FIG. 5c schematically illustrates exemplary timing characteristics of such a sequence. As illustrated, the illumination scheme 40 consists of a repeated emission of a sequence 30 of individual pulses 10. The width of the individual pulses 10 is determined by the maximal operating range. The entire sequence may be repeated at a frequency of, for example, 60 Hz.

Reflections of light by objects at a short distances are more likely to cause pixel saturation, because the attenuation of such a reflection will be much less than that of a reflection originating from a more distant object (due to the inverse-square law of light attenuation over distance). As certain applications, such as automotive applications, require accurate system operation up to relatively long distances, a large photon span must be covered between the nearest distances of operation and the farthest distances of operation. With these constraints, pixel saturation at short range is a very real risk, in particular at the first well (which receives the bulk of the reflection at short range). The inventors have found that for given total pixel space, the saturation problem can be mitigated by using an asymmetric well arrangement, in which the photon capacity represented by the first well is increased, and the photon capacity represented by the second well is decreased. If the increase and decrease are balanced, an increase of the dynamic range can be obtained at no additional pixel surface cost.

Blooming is a phenomenon that happens when the charge in a pixel exceeds the saturation level of that specific pixel. Consequently, the charge starts to overflow and causes nuisance in adjacent pixels. This creates inaccurate data in the neighboring pixels. Preferably, the pixels of the system according to the present invention are provided with anti-blooming electronics, to bleed off the excess charge before it saturates the relevant well and spills over to the wells of adjacent pixels. In particular when the information from neighboring spots is used for the elimination of background light, it is of great importance to have an accurate estimation of the background light which is obtained independently (and without contamination from) neighboring pixels.

Embodiments of the present invention may employ correlated double sampling to correct the samples for the thermal noise related to the capacity of the wells (also designated as "kTC noise"). To this end, the electronics of the pixel may be designed to carry out a differential measurement between the reset voltage ($V_{reset}$) and the signal voltage ($V_{signal}$), for example by measuring $V_{reset}$ at the beginning of the frame and measuring $V_{signal}$ at the end of the frame. As an alternative to an electronic (in-pixel) implementation, correlated double sampling may also be implemented by digitally subtracting the read-out signals ($V_{signal}-V_{reset}$) in a processor.

To increase the amount of light that reaches the photosensitive elements (in particular diodes) in the pixel structure, embodiments of the present invention may use backside illumination; in that case, the pixel circuitry is behind the photosensitive layer, thus reducing the number of layers that must be traversed by the impinging photons to read the photosensitive elements.

The ranging system according to the present invention may be integrated with a triangulation-based system in accordance with WO 2015/004213 A1. If miniaturization is aimed for, the triangulation-based system will end up having a relatively small distance between its projector and its detector, thus leaving it with a reduced operating range. However, it is precisely at short range that the combination presents its benefit, because the triangulation-based system can cover the distances at which the time-of-flight based system cannot operate sufficiently accurately.

The entire ranging process may be repeated iteratively, so as to monitor the distance to the detected object or objects over time. Thus, the result of this method can be used in processes that require information about the distance to detected objects on a continuous basis, such as advanced driver assistance systems, vehicles with an active suspension, or autonomous vehicles.

In order for all elements of the system as described to operate optimally, the system has to be thermally stable. Thermal stability avoids, among other things, undesired wavelength shifts of the optical elements (thermal drift), which would otherwise impair the proper functioning of the optical filters and other elements of the optical chain. Embodiments of the system according to the present invention achieves thermal stability by their design, or by active regulation by means of a temperature control loop with a PID-type controller.

WO 2015/004213 A1 discloses various techniques to minimize the amount of ambient light that reaches the pixels during the detection intervals, thus improving the accuracy of the detection of the patterned laser spots. While these techniques have not been disclosed in the context of a LIDAR system, the inventors of the present invention have found that several such techniques yield excellent results when combined with embodiments of the present invention. This is particularly true for the use of narrow bandpass filters at the detector, and the use of adequate optical arrangements to ensure nearly perpendicular incidence of the reflected light onto the filters. The details of these arrangements as they appear in WO 2015/004213 A1 are hereby incorporated by reference. Further features and details are provided hereinafter.

While various techniques known from WO 2015/004213 A1 may be applied to embodiments of the present invention to minimize the amount of ambient light that reaches the pixels during the detection intervals, a certain amount of ambient light cannot be avoided. In a multi-pixel system, only some of the pixels will be illuminated by reflected spots, while others will be illuminated by residual ambient light only. The signal levels of the latter group of pixels can be used to estimate the contribution of the ambient light to the signals in the pixels of interest, and to subtract that contribution accordingly. Additionally or alternatively, background light or ambient light may be subtracted from the detected signal at pixel level. This requires two exposures, one during the arrival of the laser pulse and one in the absence of a pulse.

In some embodiments, the detector may be a high dynamic range detector, i.e. a detector having a dynamic range of at least 90 dB, preferably at least 120 dB. The presence of a high dynamic range sensor, i.e. a sensor capable of acquiring a large amount of photons without saturation while maintaining sufficient discrimination of intensity levels in the darkest part of the scene, is an advantage of the use of such a sensor; it allows for a sensor that has a very long range and yet remains capable of detection objects at short distance (where the reflected light is relatively intense) without undergoing saturation. The inventors have found that the use of a true high dynamic range sensor is more advantageous than the use of a sensor that applies tone mapping. In tone mapping, the sensor linear range is compressed towards the higher resolution. In literature, several compression methods are documented, such as logarithmic compression or multilinear compression (see FIG. 4). However, this non-linear compression necessitates relinearisation of the signals before performing logical or arithmetic operations on the captured scene to extract the relief information. The solution according to the invention therefore increases detection accuracy without increasing the computational requirements. It is a further advantage of some embodiments to use a fully linear high dynamic range sensor. A pixel architecture and an optical detector that are capable of providing the desired dynamic range characteristics are disclosed in US patent application publication no. US 2014/353472 A1, in particular paragraphs 65-73 and 88, the content of which is incorporated by reference for the purpose of allowing the skilled person to practice this aspect of the present invention.

Embodiments of the present invention use a high dynamic range pixel. This can be obtained by a sizeable full-well capacity of the charge reservoir or by designs limiting the electronic noise per pixel or by usage of CCD gates that do not add noise at charge transfer, or through a design with a large detection quantum efficiency (DQE) (e.g., in the range of 50% for front illumination or 90% in case of back illumination, also known as back thinning), or by a special design, or by any combination of the listed improvements. Furthermore, the dynamic range can be further enlarged by adding an overflow capacity to the pixel in overlay at its front side (this implementation requires back thinning). Preferably, the pixel design implements an anti-blooming mechanism.

European patent application no. EP15191288.8 in the name of the present applicant, which has not been published at the filing date of the present application, describes further aspects of a system and method for determining a distance to an object, which may be combined with the present disclosure.

In embodiments of the present invention, e.g. where active suspension vehicle applications are envisaged, the projection of the spot pattern is advantageously directed downwards, i.e. towards the road.

A system according to the invention may include an implementation of steps of the methods described above in dedicated hardware (e.g., ASIC), configurable hardware (e.g., FPGA), programmable components (e.g., a DSP or general purpose processor with appropriate software), or any combination thereof. The same component(s) may also include other functions. The present invention also pertains to a computer program product comprising code means implementing the steps of the methods described above, which product may be provided on a computer-readable medium such as an optical, magnetic, or solid-state carrier.

The present invention also pertains to a vehicle comprising the system described above.

Embodiments of the present invention may be used advantageously in a wide variety of applications, including without limitation automotive applications, industrial applications, gaming applications, and the like, and this both indoor and outdoor, at short or long range. In some applications, different sensors according to embodiments of the present invention may be combined (e.g., daisy-chained) to produce panoramic coverage, preferably over a full circle (360° field of view).

It should be noted that the method, the pixel, and the pixel array according to the present invention may also be used in triangulation-based systems such as the system of WO 2015/004213 A1, and in existing LIDAR systems, to improve the quality of the measurements in the presence of ambient light.

While the invention has been described hereinabove with reference to separate system and method embodiments, this was done for clarifying purposes only. The skilled person will appreciate that features described in connection with the system or the method alone, can also be applied to the method or the system, respectively, with the same technical effects and advantages. Furthermore, the scope of the invention is not limited to these embodiments, but is defined by the accompanying claims.

The invention claimed is:

1. A method for subtracting background light from an exposure value of a pixel in an imaging array, said pixel receiving a reflection of a spot from a scenery illuminated by a periodically pulsed pattern of spots, said periodically pulsed pattern comprising in alternation an illuminated phase and a non-illuminated phase, the method comprising:

accumulating in said pixel a charge in proportion to a first quantity of incident light, received in a photosensitive element of said pixel while detecting said spot during a predetermined amount of time; and decreasing said charge in proportion to a second quantity of incident light received during said predetermined amount of time in absence of said spot;

wherein said second quantity of incident light comprises light received in said photosensitive element of said pixel during said predetermined amount of time in said non-illuminated phase.

2. A system for determining a distance to an object comprising:

a solid-state light source arranged for projecting a pattern of spots of laser light towards said object in a sequence of pulses;

a detector comprising an imaging array of a plurality of pixels, each of said pixels being configured to:

receive a reflection of a spot from a scenery illuminated by a periodically pulsed pattern of spots, said periodically pulsed pattern comprising in alternation an illuminated phase and a non-illuminated phase accumulate in said pixel a charge in proportion to a first quantity of incident light, received in a photosensitive element of said pixel while detecting said spot during a predetermined amount of time; and decrease said charge in proportion to a second quantity of incident light received during said predetermined amount of time in absence of said spot wherein said second quantity of incident light comprises light received in said photosensitive element of said pixel during said predetermined amount of time in said non-illuminated phase;

said detector being configured for detecting light representing said pattern of spots as reflected by said object in synchronization with said sequence of pulses; and processing means configured to calculate said distance to said object as a function of exposure values generated by said pixels in response to said detected light;

wherein said pixels are configured to generate said exposure values by accumulating, for each pulse of said sequence, a first amount of electrical charge representative of a first amount of light reflected by said object during a first predetermined time window and a second electrical charge representative of a second amount of light reflected by said object during a second predetermined time window, said second predetermined time window occurring after said first predetermined time window.

* * * * *